United States Patent [19]

Warrick

[11] Patent Number: 4,556,085

[45] Date of Patent: Dec. 3, 1985

[54] SOLENOID VALVE

[75] Inventor: Frank G. Warrick, Muskegon, Mich.

[73] Assignee: Sealed Power Corporation, Muskegon, Mich.

[21] Appl. No.: 577,852

[22] Filed: Feb. 7, 1984

[51] Int. Cl.$^4$ ............................................ F15B 13/044
[52] U.S. Cl. ............................ 137/625.65; 251/129.21; 251/129.14
[58] Field of Search ................... 137/625.65; 251/139, 251/141

[56] References Cited

U.S. PATENT DOCUMENTS

| | | | |
|---|---|---|---|
| 3,828,818 | 8/1974 | Hunt | 137/625.65 |
| 3,861,644 | 1/1975 | Knape | 251/139 |
| 3,865,312 | 2/1975 | Lombard et al. | 251/139 X |
| 4,320,781 | 3/1982 | Bouvet et al. | 251/139 X |
| 4,456,434 | 6/1984 | El Ibiary | 137/625.65 X |

FOREIGN PATENT DOCUMENTS 937555  11/1973  Canada ................................. 251/141

Primary Examiner—Gerald A. Michalsky
Attorney, Agent, or Firm—Barnes, Kisselle, Raisch, Choate, Whittemore & Hulbert

[57] ABSTRACT

A solenoid valve comprising a housing including a first transverse wall, a first axial extension extending from the transverse wall, and an integral peripheral wall extending axially in the opposite direction from the periphery of the transverse wall. A center pole member includes a pole extending axially within the peripheral wall of the housing and includes a second transverse wall extending radially outwardly into engagement with the peripheral wall. The center pole includes an axial extension extending in the opposite direction from the first axial extension. A coil surrounds the pole piece. The axial extensions of the housing include axial openings and the center pole includes an axial opening aligned with the openings of the axial extensions. A ball valve has limited axial movement between the seats on the center pole and second axial extension. A groove is formed at the area of juncture of the center pole and the second transverse wall and a plurality of axially extending passages extend from the groove to the periphery of the second axial extension.

10 Claims, 5 Drawing Figures

U.S. Patent    Dec. 3, 1985    4,556,085
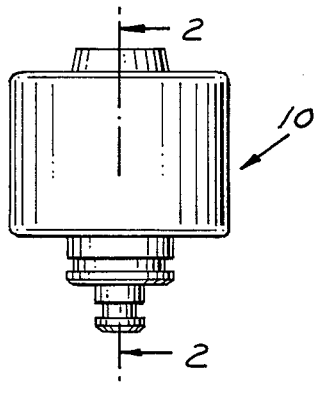
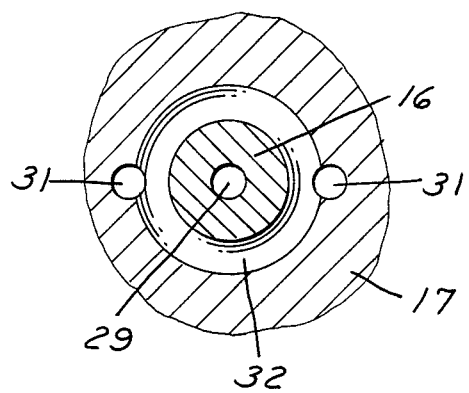
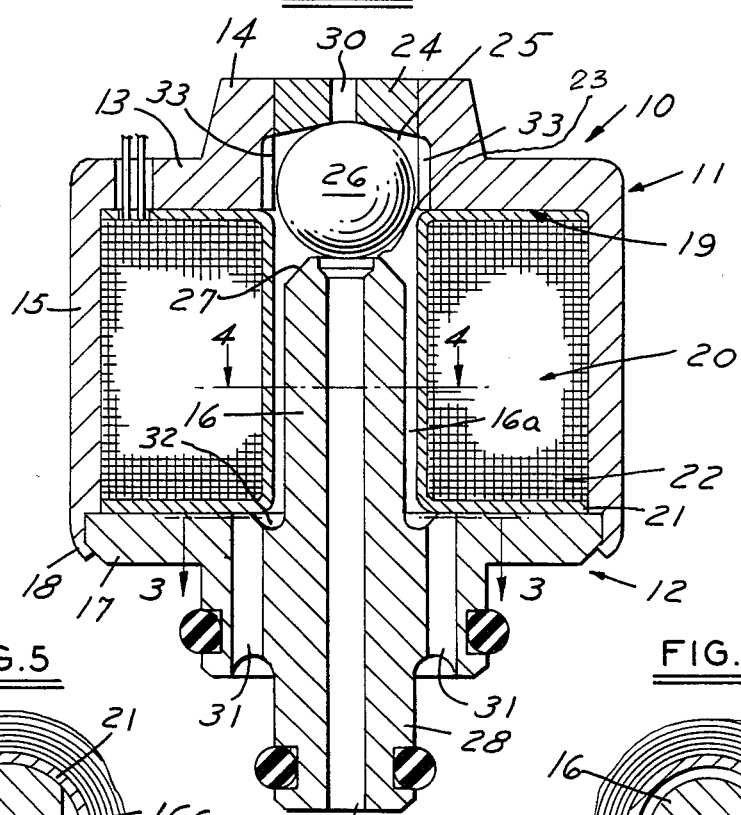
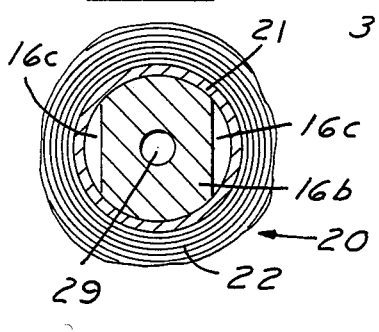
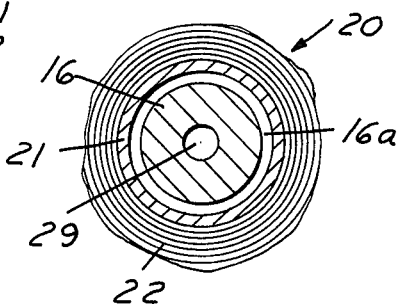

SOLENOID VALVE

This invention relates to solenoid valves such as are utilized in automatic transmissions.

BACKGROUND AND SUMMARY OF THE INVENTION

It has therefore been suggested that the valves of a hydraulic transmission such as utilized in vehicles can be controlled by a microprocessor which includes sensors that sense variables such as road speed, throttle position and engine rpm and functions to provide pulses to pulse width modulated valves which in turn control spool valves operating clutches in the transmission or control clutches directly.

In such pulse width modulator valves, it is desirable to be able to accurately control the pressure of the fluid.

The space requirements are quite small and therefore require a small valve which will function effectively in a pulse modulated mode to provide the fluid at constant pressure.

Accordingly, among the objectives of the present invention are to provide a solenoid valve which is small, utilizes a minimum number of parts to produce the desired control of pressure and can be used in a pulse width modulated mode or a steady state directional mode.

In accordance with the invention, the solenoid valve comprises a housing including a transverse wall, an integral axial extension extending from the transverse wall, and an integral peripheral wall extending axially in the opposite direction from the periphery of the transverse wall. The solenoid valve includes a center pole member which includes a pole extending axially within the peripheral wall of the housing. The center pole includes an integral transverse wall extending radially outwardly into engagement with the peripheral wall of the housing. The center pole includes an integral axial extension extending in the opposite direction from said axial extension of the housing. The housing and the transverse wall of the pole member support a coil which surrounds the pole pieces. The axial extension of the housing includes an axial opening and the center pole includes an axial opening aligned with the opening of the the axial extension. The end of the center pole within said housing defines a first valve seat and the axial extension of the housing defining a second valve seat. A ball has limited axial movement between the seats. The major portion of the ball extends into a cavity adjacent the second seat in the axial extension. The coil is spaced from the periphery of the center pole. A groove is formed in the center pole at the area of juncture of the center pole and transverse wall on the center pole member and a plurality of circumferentially spaced axially extending passages extend from the groove to the periphery of the center pole member such that when fluid is applied through the axial opening of the center pole member, it forces the ball against the second seat on the axial extension and fluid flows about the pole piece to the annular groove and thereafter outwardly through the axial passages and when the coil is energized, the ball is drawn toward the pole piece to seal against the first seat and communication is provided between the axial opening of said axial extension and the axial passages about the ball and the periphery of the pole piece.

DESCRIPTION OF THE DRAWINGS

FIG. 1 is an elevational view of a solenoid embodying the invention.

FIG. 2 is a sectional view on an enlarged scale taken along the line 2—2 in FIG. 1.

FIG. 3 is a fragmentary sectional view taken along the line 3—3 in FIG. 2.

FIG. 4 is a fragmentary sectional view taken along the line 4—4 in FIG. 2.

FIG. 5 is a fragmentary sectional view similar to FIG. 4 of a modified form of solenoid valve.

DESCRIPTION

Referring to FIGS. 1-3, the solenoid valve 10 embodying the invention comprises a housing 11 and a pole piece member 12. The housing 11 includes a transverse wall 13 that has an integral axial extension 14 and an integral peripheral cylindrical wall 15. The pole piece member 12 includes an axially extending center pole 16 that extends upwardly within the housing 11, an integral transverse wall 17 that extends radially outwardly and is connected to the peripheral wall 15 of housing 11 by crimping the lower edge of the peripheral wall 15 over the periphery of the wall 17 as at 18. Housing 11 defines an annular cavity 19 that receives a coil assembly 20 comprising a coil holder 21 and an annular coil 22.

The upper end of the pole 16 defines a first conical valve seat 23. The axial extension 14 includes an insert 24 defining a second conical valve seat 25. A ball 26 is provided between the seats 23, 25 and has limited axial movement. The periphery of the upper end of the pole 16 is tapered as at 27 to facilitate the flow of magnetic lines of flux when the solenoid is energized. The coil assembly 20 is spaced from the periphery of the pole 16 to define an annular passageway 16a.

The center pole member includes an axial extension 28. The center pole member 12 further includes an axial opening 29 and the insert 24 has an aligned axial opening 30. The center pole member 12 also includes a plurality of axial passages 31, preferably two or more, that extend to a groove 32 at the area of juncture of the pole 16 and the transverse wall 17. Grooves 33 in axial extension 14 provide communication about the periphery of the ball 26 as presently described.

When the solenoid 22 is not energized, fluid flows upwardly, as viewed in FIG. 2 through opening 29 forcing the ball 26 against the second seat 25 closing axial opening 30 but permitting flow about the periphery of the pole 16 to the annular groove 32 and then out through the axial passages 31. When the coil 22 is energized, the ball 26 is drawn downwardly against the first seat 23 to close communication and prevent flow out of the passage 29. In this position of the ball, communication is provided between the passages 31, groove 32 the space about the pole 16, grooves 33 and passage 30 to the exterior, which is normally connected to a drain or a sump.

The flux can best be visualized by reference to FIG. 2. Magnetic flux induced by the coil 20 will follow a path through the center pole 16, the end flange 17, the canister side wall 15, the canister end 13, across the air gap between the bore and the ball 26, across the air gap between the ball 26 and the pole 16, and back into the center pole 16. It should be noted that the seat 24 must be a nonmagnetic material which carries no flux so that the ball will be attracted to the center pole since no magnetic flux is available in the seat to cause an opposing force on it. The ball tends to stay centered in the air gap between the ball and the bore because the flux is uniform radially; therefore, the magnetic forces acting on the ball across the air gap are essentially balanced.

Soft iron, typically SAE 1008 to SAE 1020 or sintered iron in soft magnetic grades, is used for the flux path components because they tend to be highly ferromagnetic and relatively inexpensive. Higher grades of iron containing phosphorous or silicon can be used where necessary to enhance magnetic and/or physical properties, however, the cost is higher than for plain irons.

The annular passage 16a forms a flow passage that is most convenient and least expensive to form. Alternatively, the passage may be formed as shown in FIG. 5 by having flat surfaces 16b on the pole 16 which cooperate with the coil assembly 20 to define passages 16c.

The provision of multiple passages 31 provides equivalent or greater flow area than passage 16a in the small size of valve.

In a pulse width modulated mode the coil will be energized at some given frequency typically between 30 to 100 hertz (cycles per second). For example at 100 Hz, each cycle will be 10 milliseconds long. If the coil is energized for the entire 10 ms, virtually no pressure will be supplied to the device except for the pressure transmitted while the ball is traveling from one seat to the other. By shortening the amount of coil energized time to somewhat less than 10 ms, the amount of time the ball is "off" relative to "on" will be less so that more time is available for fluid to flow and pressurize the device. The controlled pressure output will not be uniform but will vary between zero and some peak value depending on the amount of relative "on" to "off" time in each cycle. Friction an elasticity in the hydraulic circuit tend to have a leveling effect on the pressure peaks so that the output pressure tends to be a cyclic average pressure somewhere between zero and the peak pressure. The control pressure is regulated by electrically controlling the "on" and "off" time during each cycle.

The small size envelope necessitates using the ball as a combined sealing member to eliminate assembly of several extremely small components and to allow adequate volume for the coil.

A clearance between the ball when it engages one seat and the other seat ranges between 0.008 inch and 0.030 inch. Oil pressure can be accurately regulated linearly between 10 and 100 percent of the input pressure.

It can thus be seen that there has been provided a normally open valve which is compact and provides the desired control of flow.

I claim:

1. A normally open three way solenoid valve comprising
   a housing including a first transverse wall of magnetic material,
   a first axial extension extending from said transverse wall in one direction,
   a peripheral wall of magnetic material extending axially in the opposite direction from the periphery of said transverse wall,
   a second transverse wall of magnetic material extending radially outwardly into engagement with the peripheral wall of said housing,
   a center pole of magnetic material extending axially from said second transverse all within said peripheral wall of said housing,
   said center pole including a second axial extension of magnetic material extending in the opposite direction from said axial extension of said housing,
   said transverse walls, peripheral wall and center pole defining a space,
   a coil positioned in said space surrounding said pole,
   said second axial extension and first transverse wall including an axial opening,
   the end of the center pole within said housing defining a first seat,
   a non-magnetic insert in said first axial extension of said housing defining a second seat and having an opening,
   said first transverse wall and said first axial extension defining a cavity,
   a ball of magnetic material interposed between said first and second seats and having limited axial movement between said seats,
   the major portion of said ball extending into said cavity adjacent said second seat in said first axial extension,
   said coil having portions spaced from the periphery of said center pole and defining a passageway,
   a circumferential groove at the area of juncture of said center pole and transverse wall of said center pole, said groove facing axially toward said passageway and communicating with said passageway,
   and a plurality of circumferentially spaced axial passages spaced radially outwardly from said passageway a distance such that the passages do not intersect said passageway, said passages intersecting said groove thereby providing communication with said passage, said passages extending from said groove to the exterior of said second axial extension such that when fluid is applied through the axial opening of said center pole and the coil is de-energized, fluid forces the ball against the second seat of said first axial extension and fluid flows through the axial opening of said second axial extension past said first seat about the pole to the annular groove and thereafter outwardly through the passages, and when the coil is energized, the ball is drawn toward the pole to seal against the first seat and permit flow through the axial opening of said first axial extension about the ball and the periphery of the pole and through the passages.

2. The solenoid valve set forth in claim 1 wherein said passageway between said coil and said center pole is annular.

3. The solenoid valve set forth in claim 1 wherein said pole includes flat surfaces spaced from said coil defining a plurality of passageways.

4. The solenoid valve set forth in claim 1 wherein the clearance between the ball when it is in engagement with one seat and the other seat ranges between 0.008 inch and 0.030 inch.

5. The solenoid valve set forth in claim 1 including a plurality of axially extending grooves in said cavity in said first axial extension about said ball providing communication between said passageway about said pole and said axial opening in said first axial extension.

6. A normally open three way solenoid valve comprising a housing including a first transverse wall of magnetic material, an integral first axial extension of magnetic material extending from said transverse wall in one direction, an integral peripheral wall of magnetic material extending axially in the opposite direction from the periphery of said transverse wall, a center pole of magnetic material extending axially within said peripheral wall of said housing, said center pole including an integral transverse wall extending radially outwardly into engagment with the peripheral wall of said housing, said center pole including an integral second axial extension of magnetic material extending in the opposite direction from said axial extension of said housing, said transverse walls, peripheral wall and center pole defining a space, a coil positioned in said space and surrounding said pole, said second axial extension and first transverse wall of said housing including an axial opening, the end of the center pole within said housing defining a first seat, a non-magnetic insert in said first axial extension in said housing defining a second seat and having an opening, said first transverse wall and said first axial extension defining a cavity, a ball of magnetic material interposed between said first and second seats and having limited axial movement between said seats, the major portion of said ball extending into said cavity adjacent said second seat in said first axial extension, said coil having portions spaced from the periphery of said center pole and defining a passageway, a circumferential groove at the area of juncture of said center pole and transverse wall of said center pole, said groove facing axially toward said passageway and communicating with said passageway, and a plurality of circumferentially spaced axial passages spaced radially outwardly from said passageway a distance such that the passages do not intersect said passageway, said passages intersecting said groove thereby providing communication with said passageway, said passages extending from said groove to the exterior of said second axial extension such that when fluid is applied through the axial opening of said center pole and the coil is de-energized, fluid forces the ball against the second seat of said first axial extension and fluid flows through axial opening of said second extension past said first seat about the pole to the annular groove and thereafter outwardly through the passages, and when the coil is energized, the ball is drawn toward the pole to seal against the first seat and permit flow through the axial opening of said first axial extension about the ball and the periphery of the pole and through the axial passages.

7. The solenoid valve set forth in claim 6 wherein said passageway between said coil and said center pole is annular.

8. The solenoid valve set forth in claim 6 wherein said pole includes flat surfaces spaced from said coil defining a plurality of passageways.

9. The solenoid valve set forth in claim 6 wherein the clearance between the ball when it is in engagement with one seat and the other seat ranges between 0.008 inch and 0.030 inch.

10. The solenoid valve set forth in claim 9 including a plurality of axially extending grooves in said cavity in said first axial extension about said ball providing communication between said passageway about said pole and said axial opening in said first axial extension.

* * * * *

UNITED STATES PATENT AND TRADEMARK OFFICE
CERTIFICATE OF CORRECTION

PATENT NO. : 4,556,085
DATED : December 3, 1985
INVENTOR(S) : Frank G. Warrick

It is certified that error appears in the above-identified patent and that said Letters Patent are hereby corrected as shown below:

Column 1, line 9  - "therefore" should be --heretofore--

Column 1, line 44 - "pieces" should be --piece--

Column 4, line 2  - "all" should be --wall--

Signed and Sealed this

Twenty-second Day of July 1986

[SEAL]

Attest:

DONALD J. QUIGG

Attesting Officer

Commissioner of Patents and Trademarks